US008112223B2

(12) United States Patent
Jordan et al.

(10) Patent No.: US 8,112,223 B2
(45) Date of Patent: Feb. 7, 2012

(54) METHOD FOR MEASURING LATERAL MOVEMENTS IN A DRIVER ASSISTANCE SYSTEM

(75) Inventors: Ruediger Jordan, Stuttgart (DE); Oliver Schwindt, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 528 days.

(21) Appl. No.: 12/326,137

(22) Filed: Dec. 2, 2008

(65) Prior Publication Data

US 2009/0157314 A1 Jun. 18, 2009

(30) Foreign Application Priority Data

Dec. 4, 2007 (DE) ......................... 10 2007 058 242

(51) Int. Cl.
*G08G 1/00* (2006.01)

(52) U.S. Cl. ............................. 701/300; 342/70; 701/96

(58) Field of Classification Search .................. 701/300, 701/96, 229; 342/70, 71, 109, 133, 139, 342/146, 147, 435, 436
See application file for complete search history.

(56) References Cited

U.S. PATENT DOCUMENTS 5,314,037 A 5/1994 Shaw et al.
6,243,844 B1 * 6/2001 Tonks .......................... 714/758
6,628,227 B1 * 9/2003 Rao et al. ........................ 342/70
7,268,711 B1 * 9/2007 Hofer ............................ 341/118
7,504,988 B2 * 3/2009 Tsuchihashi et al. ........... 342/70
7,786,896 B2 * 8/2010 Schmid et al. ............. 340/932.2
7,903,023 B2 * 3/2011 Cornic et al. ................. 342/139
7,925,418 B2 * 4/2011 Fabien ........................... 701/103
2003/0045991 A1 * 3/2003 Isogai et al. .................... 701/96
2003/0163280 A1 * 8/2003 Steinlechner et al. ........ 702/141
2004/0117115 A1 * 6/2004 Zimmermann et al. ...... 701/300
2005/0114024 A1 * 5/2005 Benham et al. ............... 701/224
2005/0156780 A1 7/2005 Bonthron et al.
2005/0232463 A1 * 10/2005 Hirvonen et al. ............. 382/103
2006/0132354 A1 * 6/2006 Beard et al. ................... 342/160

FOREIGN PATENT DOCUMENTS

| | | |
|---|---|---|
| DE | 19806687 | 8/1999 |
| DE | 199 49 409 | 4/2001 |
| DE | 10 2004 028 822 | 1/2006 |
| EP | 1788408 | 5/2007 |
| WO | WO 96/31783 | 10/1996 |
| WO | WO 03/031228 | 4/2003 |

* cited by examiner

*Primary Examiner* — Thomas Black
*Assistant Examiner* — Marthe Marc-Coleman
(74) *Attorney, Agent, or Firm* — Kenyon & Kenyon LLP

(57) ABSTRACT

Method for determining a dynamic variable representative for a lateral movement of a located object in a driver assistance system for motor vehicles, which has two angle-resolving distance sensors situated laterally offset to one another for locating the object, using which a radial component of the relative velocity of the object along the particular line of sight is also measurable, wherein the dynamic variable is calculated on the basis of the radial components of the relative velocity measured by the two distance sensors.

10 Claims, 4 Drawing Sheets x
y
v
$v_{abs}$
16
18
v
20L
20R
α
β
14L
14R
$v_{rL}$
$v_{rR}$
10
12

22
$v_{abs}$
$v_{rL}$
26
24
ω
$v_{rR}$
28
20L
20R
α
β

14L
14R
$v_{rL}$
$v_{rR}$
10
x
y

METHOD FOR MEASURING LATERAL MOVEMENTS IN A DRIVER ASSISTANCE SYSTEM

FIELD OF THE INVENTION

The present invention relates to a method for determining a dynamic variable representative for a lateral movement of a located object in a driver assistance system for motor vehicles, which has two angle-resolving distance sensors situated laterally offset to one another for locating the object, using which a radial component of the relative velocity of the object along the particular line of sight is also measurable.

BACKGROUND INFORMATION

Examples of driver assistance systems in which the present invention is used are, for example, so-called ACC systems (adaptive cruise control), which allow an automatic regulation of the distance to a preceding vehicle (the object), as well as predictive safety systems (PSS), which are used for automatically recognizing an imminent collision, so that measures for avoiding the collision or for mitigating the collision consequences may be initiated.

Precise knowledge of the lateral movements of the object is significant, for example, in the cases in which a merging vehicle, from which an increased danger of collision originates, is to be recognized as early as possible or, vice versa, the earliest possible recognition of vehicles turning off or leaving the host vehicle's lane is necessary, so that the host vehicle is not decelerated unnecessarily strongly and/or may accelerate again earlier.

The transverse component of the velocity (in the direction transverse to the roadway) and the yaw rate of the object may be cited in particular as examples of dynamic variables which are representative for the lateral movement of an object. The yaw rate is significant because it allows an early estimation of the future movement direction and thus the lateral velocity of the object.

Typical driver assistance systems normally have an angle-resolving, long-range radar sensor (LRR) for locating preceding vehicles and other objects, using which the distance and the relative velocity or, more precisely, the radial component of the relative velocity may be measured relatively precisely. The angle resolution capability of the radar sensor additionally allows at least a coarse estimation of the azimuth angle, so that together with the distance information, the position of the object in a two-dimensional coordinate system may be determined. Because of the limited angle resolution capability, the precision when determining the lateral position (y position) of the object is significantly worse, however, than the precision when determining the distance.

A direct measurement of the transverse component of the velocity of the object is not possible. This variable may therefore only be determined indirectly, by tracking the lateral positions of the object over a certain period of time and differentiating with respect to time. The unavoidable inaccuracies in the measurement of the lateral position of the object are reinforced still further upon the calculation of the derivatives with respect to time, so that the results are subject to significant measurement noise, which may not be entirely suppressed even by filtering the data. The calculation of the derivative with respect to time and the filtering operations additionally have the result that the data for the lateral velocity of the object are only available comparatively late.

A driver assistance system is described in German Patent No. DE 199 49 409, in which two short-range radar sensors (SRR) are used for locating objects ahead of the vehicle, which only measure distances and relative velocities, but not azimuth angle. Because the two sensors are situated laterally offset to one another, however, the lateral position of the object may be determined at least approximately by triangulation on the basis of the distance data. The lateral velocity may also only be determined here by differentiation with respect to time.

German Patent No. DE 10 2004 028 822 describes a driver assistance system having a "scanning" distance sensor, such as a radar or lidar sensor, using which the rear of a preceding vehicle may be scanned, so that distance data are obtained for multiple points on the rear of the object, the particular associated azimuth angles being known. Under the assumption that the reflection points from which the distance data are obtained lie approximately on a straight line which is oriented perpendicular to the longitudinal axis and thus to the motion direction of the object, the orientation of the object and, on the basis of this, the lateral velocity of the object are determined from the distance data. The precision is also decisively a function of the angle resolution capability of the sensor in this method.

SUMMARY OF THE INVENTION

An object of the present invention is to provide a method for driver assistance systems, which allows rapid and precise determination of at least one dynamic variable which is representative for the lateral movement of a located object.

This object is achieved in a method according to the present invention in that the dynamic variable is calculated on the basis of the radial components of the relative velocity measured by the two distance sensors.

The method according to the present invention assumes that two distance sensors are provided, which are situated at a specific lateral distance from one another on the host vehicle, and each of which is capable of measuring the radial component of the relative velocity of the object, "radial component" meaning the velocity component along the line of sight from the affected sensor to the object in each case. As will be explained in greater detail in the description of the exemplary embodiments, the radial components thus measured are influenced due to various effects by dynamic variables, which are representative of the lateral movement of the object, in particular by the lateral velocity and the yaw rate of the object, and these influences have the result in particular that the two sensors measure different values for the radial component of the relative velocity. The lateral movement of the object may be inferred on the basis of these differences.

An important advantage of this method is that the measurement of the lateral movement is decisively based on the analysis of relative velocities which may be measured very precisely with the aid of radar sensors. In addition, these variables may be converted directly into a lateral velocity and/or yaw rate of the object, without having to be differentiated once again with respect to time. The desired dynamic variable is therefore immediately available, and the obtained data already have a relatively high quality even without time-consuming filtering.

In one specific embodiment, the located object is viewed as a punctiform object, and the lateral velocity of the object is calculated directly on the basis of the measured radial components and azimuth angle. The inaccuracies in the determination of the azimuth angle are incorporated into the result, but the measured azimuth angle does not have to be derived with respect to time once again during the calculation of the lateral velocity, and the occurrence of measurement noise is therefore avoided, which would otherwise be caused by the derivation with respect to time of statistically fluctuating measured variables.

According to another specific embodiment, the located object is viewed as an extended object and it is assumed that the two distance sensors receive signals from two different reflection points on the object. In this case, the yaw rate of the object may also result in differences in the measured radial components.

Under the assumption that the lines of sight from the sensors to the associated reflection points on the object run approximately parallel and therefore the differences in the measured radial components of the velocity may hardly be caused by the lateral velocity of the object, the yaw rate of the object may then be determined on the basis of the difference of the measured radial components and the distance of the reflection points.

This is particularly advantageous for early recognition of vehicles turning off, because a preceding vehicle which constantly remains in its own lane will have a yaw rate close to zero, while in the starting phase of a turning operation, as soon as the driver of this vehicle turns the steering wheel, the yaw rate increases abruptly. A change in the lateral velocity also occurs only as a result of this yaw rate change. The present invention therefore has the advantage that it allows turning or lane-changing operations of preceding vehicles to be recognized already as they begin.

By integrating the yaw rate over time, the current orientation of the object may also be determined, from which the lateral velocity may in turn be calculated.

On the other hand, if the two reflection points on an extended object lie relatively close to one another, the influence of the yaw rate may be neglected and the differences in the measured radial component of the relative velocity may be converted directly into a lateral velocity, as for a punctiform object.

The method described above for analyzing the data for an extended object is based on various assumptions which will normally only be approximately fulfilled in practice. However, it is possible to perform the analysis methods based on various idealizing assumptions in parallel and then to calculate weighted mean values from the values thus obtained for the desired dynamic variables, the weighting being a function of how realistic the relevant idealizing assumptions are in the particular situation.

According to still a further specific embodiment of the method according to the present invention, a relationship between the differences in the measured radial components of the relative velocity and a probability parameter, which indicates the probability of a turning operation and/or lane change, is set up directly on the basis of geometric models and/or empirical data. This probability parameter is also a dynamic variable representative of the lateral movement of the object in the meaning of the present invention.

DETAILED DESCRIPTION

Figure 1:
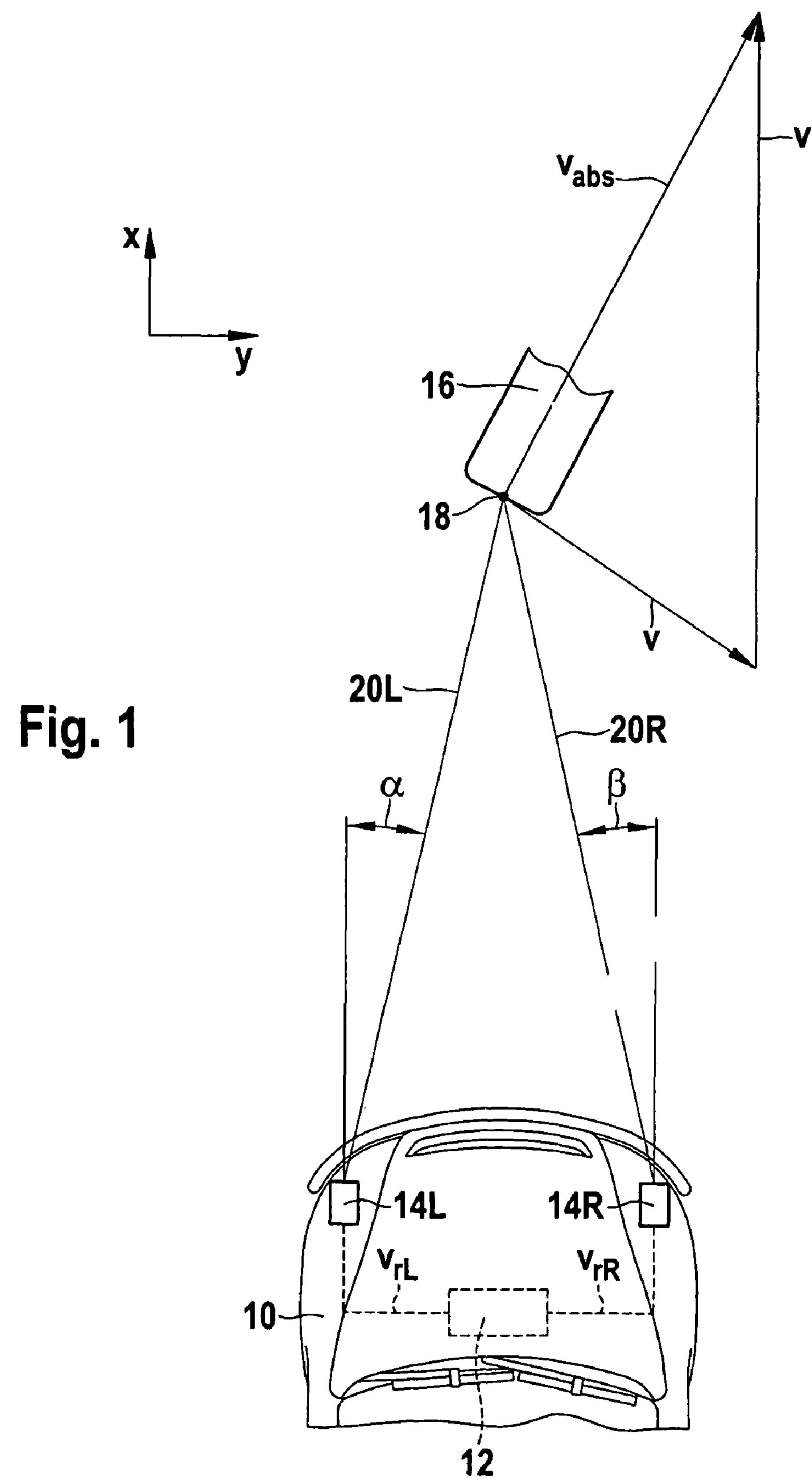
FIG. 1 shows a sketch of a vehicle equipped with a driver assistance system when locating an approximately punctiform object.

FIG. 1 schematically shows the front part of a motor vehicle 10, which is equipped with a driver assistance system 12, such as an ACC system. This driver assistance system includes two angle-resolving distance sensors 14L and 14R, which are installed in proximity to the left and right lateral delimitations of vehicle 10 in the front part, so that they jointly monitor the area in front of vehicle 10. For example, distance sensors 14L and 14R are long-range radar sensors (LRR).

In the example shown, an approximately punctiform object 16, such as the rear end of a preceding motorcycle, is located by both distance sensors 14L and 14R. It may be assumed as a somewhat idealized case that both sensors receive radar echoes from a single reflection point 18 on the rear of object 16. Accordingly, left distance sensor 14L measures the value for the distance between reflection point 18 and this distance sensor and a value for radial component $v_{rL}$ of the relative velocity of object 16, i.e., the relative velocity component in the direction parallel to line of sight 20L, which connects radar sensor 14L to reflection point 18. In addition, distance sensor 14L also measures azimuth angle $\alpha$ between the forward direction of vehicle 10 and line of sight 20L on the basis of its angle-resolving capability.

Correspondingly, right distance sensor 14R measures the distance between this sensor and reflection point 18, radial component $v_{rR}$ of the relative velocity of object 16 along line of sight 20R, and azimuth angle $\beta$ between this line of sight and the forward direction.

The forward direction of vehicle 10 defines a coordinate system having axis x running in the travel direction of this vehicle and axis y running perpendicular thereto. A vector diagram is drawn for object 16, which indicates absolute velocity $V_{abs}$ of this object and its relative velocity v in relation to vehicle 10. The difference between absolute and relative velocities is intrinsic velocity V of vehicle 10.

A method will now be described, using which it is possible to obtain a relatively precise value for the vector of relative velocity v of object 16 on the basis of the data of distance sensors 14L and 14R, in particular also a relatively precise value for the relative lateral velocity of object 16, i.e., for y component $v_y$ of vector v.

Figure 2:
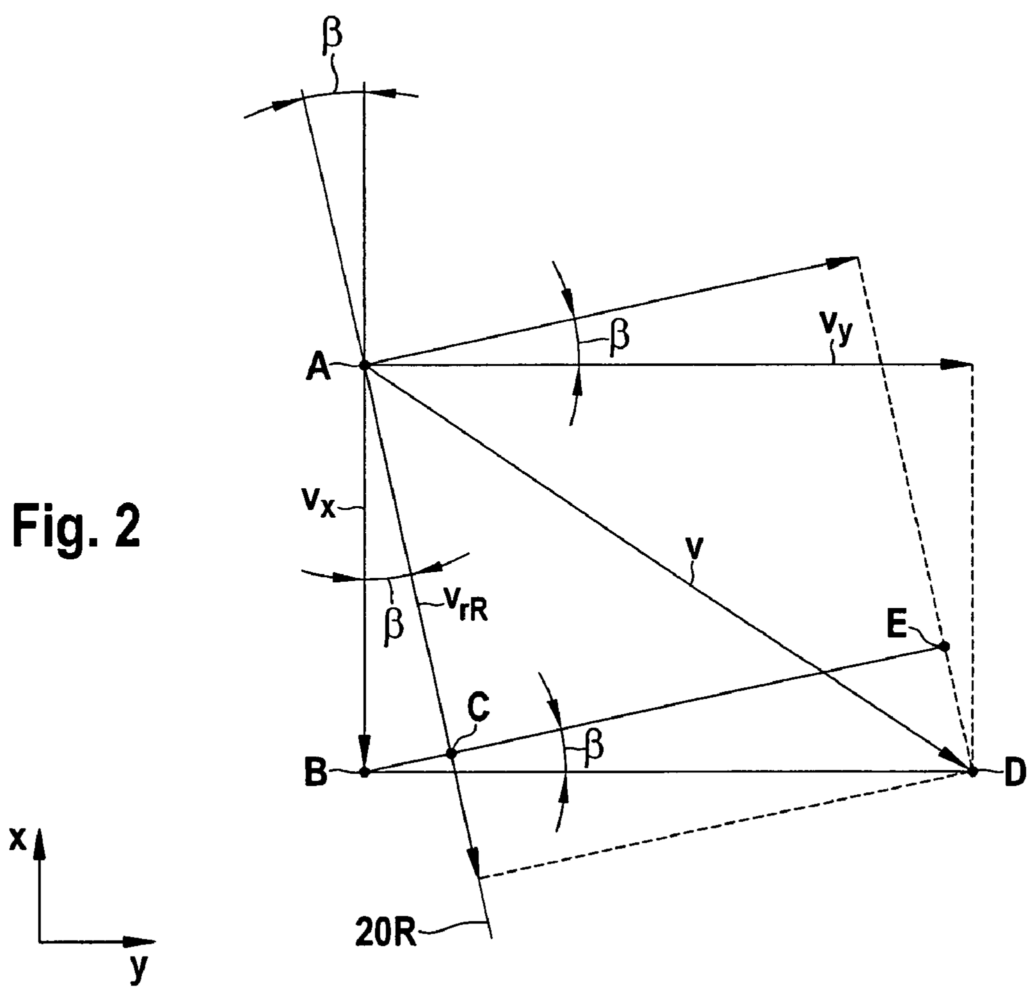
FIG. 2 shows a vector diagram for FIG. 1.

Relative velocity v is decomposed into its components $v_x$ and $v_y$ in FIG. 2. In addition, line of sight 20R from right distance sensor 14R in FIG. 1, i.e., the line of sight which forms angle $\beta$ with the forward direction, and radial component $v_{rR}$ of the relative velocity along this line of sight are shown.

A right triangle A, B, C may be seen in FIG. 2, whose hypotenuse is x component $v_x$ of the relative velocity. This triangle contains angle $\beta$, and its adjacent side is a part of the vector which represents radial component $v_{rR}$.

Furthermore, a right triangle B, D, E may be seen, having lateral velocity $v_y$ as the hypotenuse. This triangle also contains angle $\beta$, and its opposite side (section D-E) corresponds to the missing part of radial component $v_{rR}$. It follows therefrom:

$$v_{rR}=v_y*\sin\beta+v_x*\cos\beta \quad (1)$$

The corresponding equation is obtained for line of sight 20L:

$$v_{rL}=v_y*\sin\alpha+v_x*\cos\alpha \quad (2)$$

Overall, the matrix equation is thus obtained:

$$\begin{pmatrix} v_{rL} \\ v_{rR} \end{pmatrix} = \begin{pmatrix} \sin\alpha\cos\alpha \\ \sin\beta\cos\beta \end{pmatrix} * \begin{pmatrix} v_x \\ v_y \end{pmatrix} = M^* \begin{pmatrix} v_x \\ v_x \end{pmatrix} \quad (3)$$

To obtain the desired variables $v_y$ and $v_x$, matrix M only still has to be inverted in a known way:

$$\begin{pmatrix} v_x \\ v_y \end{pmatrix} = (\sin(\alpha-\beta))^{-1*} \begin{pmatrix} \cos\beta & -\cos\alpha \\ -\sin\beta\cos\alpha & \end{pmatrix} * \begin{pmatrix} v_{rL} \\ v_{rR} \end{pmatrix} \quad (4)$$

In this way, vectorial relative velocity v of object 16 and thus in particular also its lateral velocity $v_y$, are obtained from measured azimuth angles α and β and measured radial components $v_{rL}$ and $v_{rR}$, and this is performed directly, without passing by a derivative with respect to time of the y location coordinate (lateral position) of reflection point 18.

These calculations are executed in an electronic computer which is part of driver assistance system 12.

Figure 3:
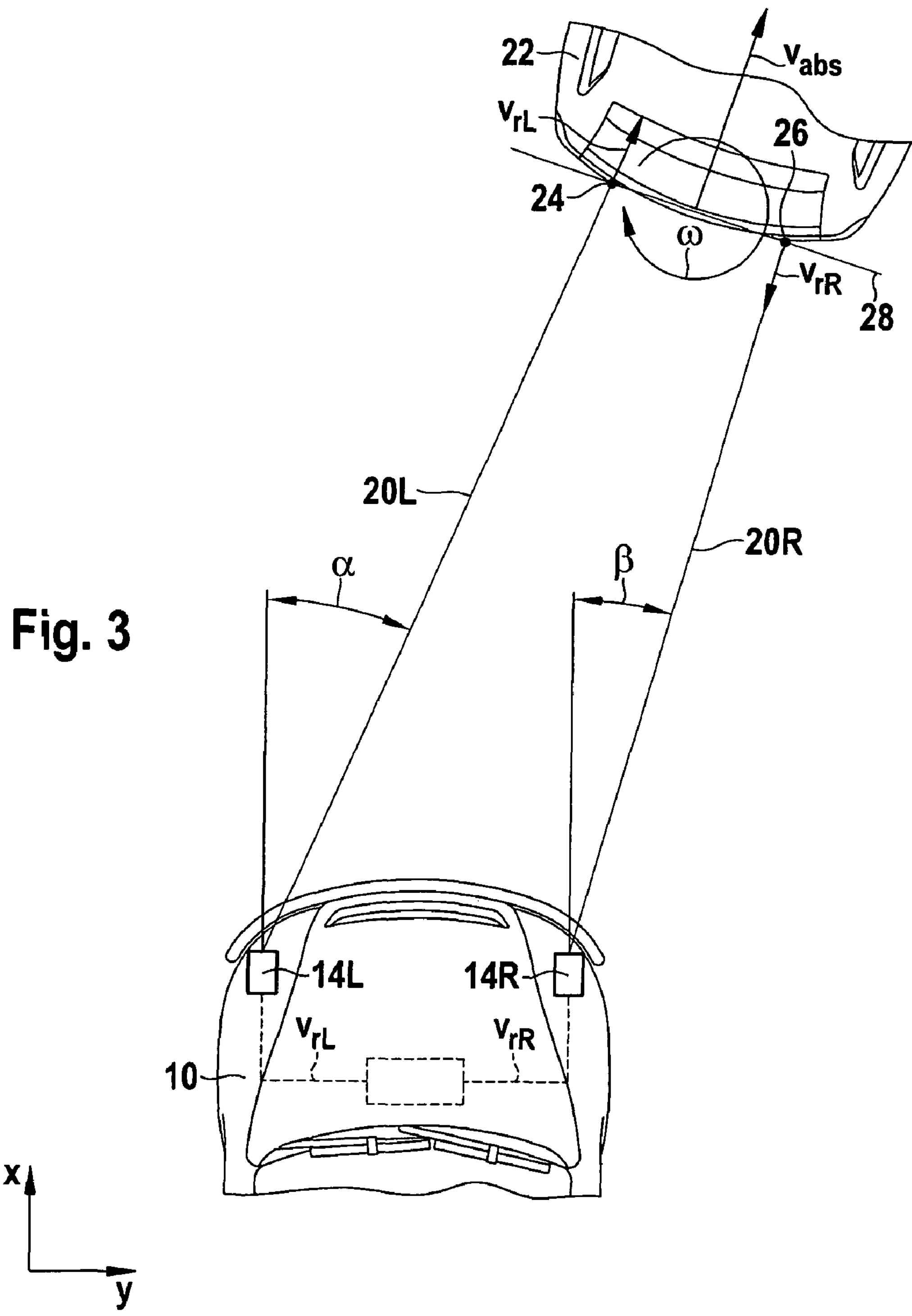
FIG. 3 shows a sketch of the vehicle from FIG. 1 when locating an extended object.

FIG. 3 shows a sketch similar to FIG. 1, in which an extended object 22, such as the rear of a preceding passenger automobile, is located by the two distance sensors 14L, 14R instead of an approximately punctiform object. Left distance sensor 14L receives a radar echo from a reflection point 24 in this case, while right distance sensor 14R receives an echo from another reflection point 26. The location of reflection points 24, 26 is determined by the condition that at these points the perpendicular incidence of the rear of object 22 coincides with line of sight 20L or 20R, respectively. Reflection points 24 and 26 lie on a straight line 28, which corresponds to the rear of object 22, and the distance between reflection points 24, 26 is only slightly less than the width of object 22 and also differs only slightly from the distance between both distance sensors 14L, 14R of vehicle 10.

For this reason, in this case both lines of sight 20L and 20R run nearly parallel to one another. If object 22 does not execute a yaw movement, measured radial components $v_{rL}$ and $v_{rR}$ are therefore nearly equal, and they correspond to the absolute value of the relative velocity of object 22. However, it is assumed in the example shown that object 22 (for example, because of a steering wheel turn) executes a yaw movement having angular velocity ω, with the result that radial component $v_{rL}$ measured by the left distance sensor is greater and radial component $v_{rR}$ measured by the right distance sensor is correspondingly smaller.

In this case, information about the lateral movement of object 22 may be obtained in the following way.

Because the distances to particular reflection points 24 and 26 may be measured relatively precisely using distance sensors 14L and 14R and, somewhat less precisely, corresponding azimuth angles α and β may also be measured, the location of reflection points 24, 26 in the x-y coordinate system may be determined. The location of straight line 28 is thus also determined, and if one assumes that extended object 22 is a traveling vehicle, the travel direction of this vehicle will be the direction perpendicular to straight line 28. The direction of the vector which specifies absolute velocity $v_{abs}$ of object 22 is thus known, but not the absolute value of this vector.

In the example shown, radial components $v_{rL}$ and $v_{rR}$ are approximately equal with opposite signs, which means that their mean value, which specifies the radial component of the relative velocity of object 22 as a whole, is approximately zero. In this case, the absolute value of $v_{abs}$ must be equal to the component of intrinsic velocity V of vehicle 10 which is parallel to vector $v_{abs}$. This component may be determined by calculation from the known absolute value of intrinsic velocity V and the known location of straight line 28. Vector $v_{abs}$ is then known. By subtraction of intrinsic velocity V, vectorial relative velocity v and thus also its components $v_y$ and $v_x$ are obtained.

If the mean value of radial components $v_{rL}$ and $v_{rR}$ is not zero, this means that object 22 is moving in relation to vehicle 10 along nearly parallel lines of sight 20L and 20R, and the mean value of radial components $v_{rL}$ and $v_{rR}$ may be represented as a vector which describes this relative movement. This vector may also, like intrinsic velocity V, be decomposed into a component parallel to $v_{abs}$ and a component perpendicular thereto, and the absolute value of $v_{abs}$ is the sum of the parallel components of the relative velocity and intrinsic velocity V.

This method will be more precise the further apart reflection points 24 and 26 lie and the less azimuth angles α and β differ. On one hand, as a function of the contour of the rear of object 22, if reflection points 24, 26 lie relatively close to one another, the determination of the location of straight line 28 is less reliable, but on the other hand the influence of yaw rate ω is then so small that it may be neglected. In addition, azimuth angles α and β will then differ significantly from one another, so that more precise results are obtained when velocity components $v_y$ and $v_x$ are calculated according to equation (4).

It is also possible to apply both modes of calculation in parallel and to weight the results differently depending on the distance of the reflection points.

The direct analysis of difference $v_{rL}-v_{rR}$ of the radial components provides further useful information. If this is divided by the known distance between reflection points 24 and 26, yaw rate ω of object 22 is obtained directly.

On the one hand, this allows a check of the results of the previously described calculations for velocity components $v_y$ and $v_x$. Specifically, if the vector of absolute velocity $v_{abs}$ of object 22 is reconstructed therefrom and from intrinsic velocity V and tracked over multiple measuring cycles, the directions assumed by vector $v_{abs}$ must correspond to the time integral of yaw rate ω. Deviations because of measurement inaccuracies are possible, however, because the measured variables are incorporated differently in the calculation of ω on the one hand and the calculation of the direction of $v_{abs}$ on the other hand. The existence or nonexistence of such deviations therefore provides information about the precision of the measurements.

In a typical traffic situation, a preceding vehicle (object 22) is tracked over a longer period of time by the driver assistance system of vehicle 10. On a straight section, yaw rate ω will be nearly zero. However, if object 22 turns off into a side street or changes to an adjoining lane, this is always initiated by a steering operation which immediately results in a non-vanishing yaw rate ω. This increase of the yaw rate may be detected using the method described above without delay. Only in the further course of the turning or lane-changing operation will a measurable direction change of absolute velocity $v_{abs}$ result, and the corresponding measurements may be used to verify the detected turning or lane-changing operation.

The direct measurement and analysis of yaw rate ω thus allows especially early recognition of turning and lane-changing operations. This is true not only for lane-changing operations in which the preceding vehicle changes from the host lane to an adjacent lane, but rather also for merging operations, in which the preceding vehicle changes from an adjacent lane to the host vehicle's lane.

The methods described above with reference to FIGS. 1 and 2 on the one hand and FIG. 3 on the other hand share the feature that difference $v_{rL}-v_{rR}$ of the radial components becomes greater if object 16 or 22 turns to the right during a starting turning or lane-changing operation, and becomes smaller if the object turns to the left. It is therefore possible through mathematical analysis of typical traffic situations and/or by experiments to directly produce a relationship between difference $v_{rL}-v_{rR}$ of the radial components and the turning or lane-changing probability of the object.

Figure 4:
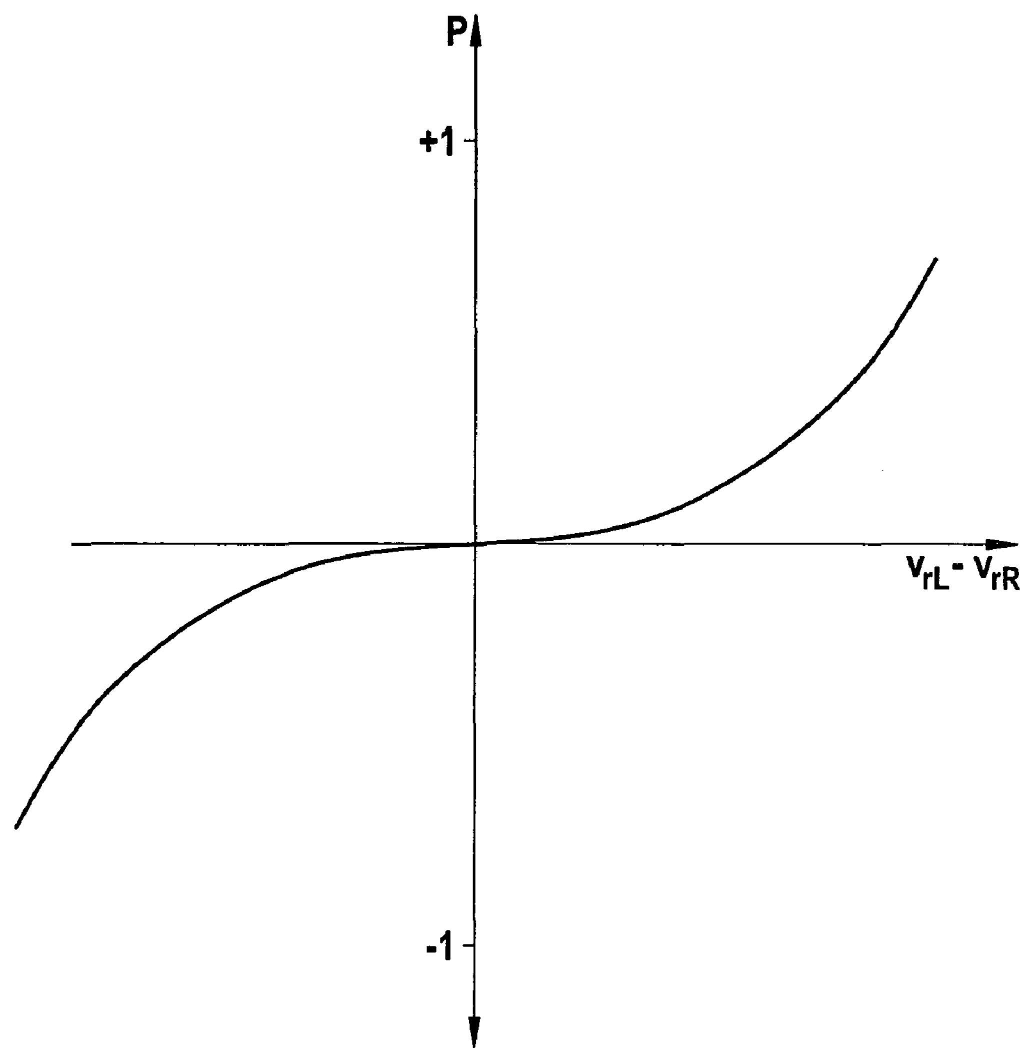
FIG. 4 shows a characteristic curve to determine a probability parameter according to a specific embodiment of the method according to the present invention.

An example of such a relationship is shown in FIG. 4. A probability parameter P is plotted against difference $v_{rL}^{\dagger}-v_{rR}$ therein. The turning probability varies between 0 and +1 and is given by the absolute value of P. The sign of P indicates the direction: for a turning operation (or lane-changing operation) to the right, P is positive, and for a turning operation (or lane-changing operation) to the left, P is negative.

If such a relationship for turning probability P is stored in driver assistance system 12, a turning operation may be recognized early, namely as soon as difference $v_{rL}-v_{rR}$ exceeds a specific threshold value. If necessary, turning probability P shown in FIG. 4 may also be combined with other probability parameters, which are based on other criteria, or the threshold value for the recognition of a turning operation may be varied on the basis of other criteria, such as the existence of a turning possibility, which is recognized on the basis of the digital street maps of a navigation system.

What is claimed is:

1. A method for determining a dynamic variable representative of a lateral movement of a located object in a driver assistance system of a motor vehicle, the method comprising:

locating the object using two angle-resolving distance sensors situated laterally offset with respect to one another;

measuring radial components of a relative velocity of the object along particular lines of sight using the two distance sensors; and determining the dynamic variable on the basis of the measured radial components;

wherein:

a distinction is made between substantially punctiform objects and extended objects on the basis of azimuth angles measured by the two distance sensors, and the method for determining the dynamic variable is selected as a function of an object type; and for substantially punctiform objects, a lateral velocity of the object is calculated, under an assumption that both distance sensors are locating a same reflection point on the object, from the azimuth angles of the reflection point measured by the distance sensors and the measured radial components.

2. The method according to claim 1, wherein for extended objects, on the basis of distance and azimuth angle data provided by the two distance sensors, positions of two reflection points in a two-dimensional x-y coordinate system are determined, a distance between the reflection points is calculated, and, on the basis of a difference of the radial components of the relative velocity measured for the reflection points, a yaw rate of the object is calculated.

3. A method for determining a dynamic variable representative of a lateral movement of a located object in a driver assistance system of a motor vehicle, the method comprising:

locating the object using two angle-resolving distance sensors situated laterally offset with respect to one another;

measuring radial components of a relative velocity of the object along particular lines of sight using the two distance sensors; and determining the dynamic variable on the basis of the measured radial components;

wherein:

a distinction is made between substantially punctiform objects and extended objects on the basis of azimuth angles measured by the two distance sensors, and the method for determining the dynamic variable is selected as a function of an object type; and for extended objects, on the basis of distance and azimuth angle data provided by the distance sensors, positions of two reflection points in a two-dimensional x-y coordinate system are determined, a distance between the reflection points is calculated, and, on the basis of a difference of the radial components of the relative velocity measured for the reflection points, a yaw rate of the object is calculated.

4. A method for determining a dynamic variable representative of a lateral movement of a located object in a driver assistance system of a motor vehicle, the method comprising:

locating the object using two angle-resolving distance sensors situated laterally offset with respect to one another;

measuring radial components of a relative velocity of the object along particular lines of sight using the two distance sensors; and determining the dynamic variable on the basis of the measured radial components;

wherein a difference of the radial components of the relative velocity is measured and, on the basis of a fixed relationship predefined in a navigation system between the difference and a probability of a turning or lane-changing operation of the object, a probability parameter is determined which provides the probability.

5. The method according to claim 4, wherein a distinction is made between substantially punctiform objects and extended objects on the basis of azimuth angles measured by the two distance sensors, and the method for determining the dynamic variable is selected as a function of an object type.

6. A driver assistance system for a motor vehicle for determining a dynamic variable representative of a lateral movement of a located object, comprising:

two angle-resolving distance sensors situated laterally offset with respect to one another on the vehicle, the two distance sensors locating the object and measuring radial components of a relative velocity of the object along particular lines of sight; and an arrangement for determining the dynamic variable on the basis of the measured radial components;

wherein:

a distinction is made between substantially punctiform objects and extended objects on the basis of azimuth angles measured by the two distance sensors, and a method for determining the dynamic variable is selected as a function of an object type; and for substantially punctiform objects, a lateral velocity of the object is calculated, under an assumption that both distance sensors are locating a same reflection point on the object, from the azimuth angles of the reflection point measured by the two distance sensors and the measured radial components.

7. A driver assistance system for a motor vehicle for determining a dynamic variable representative of a lateral movement of a located object, comprising:

two angle-resolving distance sensors situated laterally offset with respect to one another on the vehicle, the two distance sensors locating the object and measuring radial components of a relative velocity of the object along particular lines of sight; and an arrangement for determining the dynamic variable on the basis of the measured radial components;

wherein:

a distinction is made between substantially punctiform objects and extended objects on the basis of azimuth angles measured by the two distance sensors, and the method for determining the dynamic variable is selected as a function of an object type; and for extended objects, on the basis of distance and azimuth angle data provided by the two distance sensors, positions of two reflection points in a two-dimensional x-y coordinate system are determined, a distance between the reflection points is calculated, and, on the basis of a difference of the radial components of the relative velocity measured for the reflection points, a yaw rate of the object is calculated.

8. A driver assistance system for a motor vehicle for determining a dynamic variable representative of a lateral movement of a located object, comprising:

two angle-resolving distance sensors situated laterally offset with respect to one another on the vehicle, the two distance sensors locating the object and measuring radial components of a relative velocity of the object along particular lines of sight; and an arrangement for determining the dynamic variable on the basis of the measured radial components;

wherein a difference of the radial components of the relative velocity is measured and, on the basis of a fixed relationship predefined in a navigation system between the difference and a probability of a turning or lane-changing operation of the object, a probability parameter is determined which provides the probability.

9. The driver assistance system according to claim 8, wherein a distinction is made between substantially punctiform objects and extended objects on the basis of azimuth angles measured by the two distance sensors, and the method for determining the dynamic variable is selected as a function of an object type.

10. The driver assistance system according to claim 9, wherein for extended objects, on the basis of distance and azimuth angle data provided by the two distance sensors, positions of two reflection points in a two-dimensional x-y coordinate system are determined, a distance between the reflection points is calculated, and, on the basis of a difference of the radial components of the relative velocity measured for the reflection points, a yaw rate of the object is calculated.

* * * * *